(12) United States Patent
Walter et al.

(10) Patent No.: US 7,199,979 B2
(45) Date of Patent: Apr. 3, 2007

(54) HEAD GIMBAL ASSEMBLY USING SLIDER AND GIMBAL FEATURES

(75) Inventors: Lee Walter, Plymouth, MN (US); Shanlin X. Hao, Eden Prairie, MN (US); Moshe Olim, Eden Prairie, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 446 days.

(21) Appl. No.: 10/761,079

(22) Filed: Jan. 20, 2004

(65) Prior Publication Data

US 2005/0157425 A1   Jul. 21, 2005

(51) Int. Cl.
G11B 5/596 (2006.01)
(52) U.S. Cl. .................. 360/234.6; 360/245.3
(58) Field of Classification Search .............. None
See application file for complete search history.

(56) References Cited

U.S. PATENT DOCUMENTS

| | | | |
|---|---|---|---|
| 4,700,250 A | 10/1987 | Kuriyama | 360/104 |
| 5,027,238 A | 6/1991 | Konishi et al. | 360/104 |
| 5,381,288 A * | 1/1995 | Karam, II | 360/245 |
| 5,499,153 A | 3/1996 | Uemura et al. | 360/103 |
| 5,712,748 A | 1/1998 | Massee | 360/104 |
| 5,880,908 A | 3/1999 | Shiraishi et al. | 360/104 |
| 6,036,813 A | 3/2000 | Schulz et al. | 156/307.7 |
| 6,078,472 A | 6/2000 | Mitoh et al. | 360/104 |
| 6,282,063 B1 * | 8/2001 | Coon | 360/234.6 |
| 6,330,134 B2 * | 12/2001 | Kameyama | 360/234.6 |
| 6,459,549 B1 | 10/2002 | Tsuchiya et al. | 360/245.9 |

OTHER PUBLICATIONS

U.S. Appl. No. 10/684,798, filed Oct. 14, 2003.

* cited by examiner

*Primary Examiner*—R. S. Tupper
(74) *Attorney, Agent, or Firm*—Leanne R. Taveggia; Westman, Champlin & Kelly, P.A.

(57) ABSTRACT

A gimbal assembly includes a gimbal and a slider. The slider has at least one adhesive receiving feature which is formed on a mounting surface of the slider. The gimbal has a lock feature including at least one body that protrudes from a slider-engaging surface and terminates at a first end. Each body of the lock feature engages each adhesive receiving feature of the slider.

20 Claims, 7 Drawing Sheets

HEAD GIMBAL ASSEMBLY USING SLIDER AND GIMBAL FEATURES

FIELD OF THE INVENTION

The present invention relates generally to data storage systems. In particular, the present invention relates to a head gimbal assembly.

BACKGROUND OF THE INVENTION

A typical disc drive includes a housing that encloses a variety of disc drive components. The components include one or more rotating discs having data surfaces that are coated with a medium for storage of digital information in a plurality of circular, concentric data tracks. The discs are mounted on a spindle motor that causes the discs to spin. Each rotating disc has a corresponding head gimbal assembly (HGA). The HGA includes a slider, which carries a transducer that writes information to and reads information from the data surfaces of the discs. The slider and transducer are often together referred to as the "head." The HGA also includes a gimbal that that allows the slider to pitch and roll while following the topography of the disc. An actuator mechanism moves the HGAs from track to track across the surfaces of the discs under control of electronic circuitry. The actuator mechanism includes a track accessing arm and a suspension for each HGA. The suspension includes a load beam. The load beam provides a preload force, which forces the slider toward the disc surface.

The slider includes a slider body having a leading edge, a trailing edge and an air bearing surface (ABS) which faces the disc surface. As the disc rotates, the disc drags air under the slider along the air bearing surface, which creates a hydrodynamic lifting force that causes the slider to lift and fly above the disc surface. The transducer is typically mounted at or near the trailing edge of the slider.

Generally, the slider is attached to the gimbal with an adhesive droplet deposited on the back surface of the slider, which is opposite the ABS. Current equipment, for depositing an adhesive droplet on the slider body, is designed to deposit a predetermined size of adhesive. This predetermined size is large enough such that the location of the slider with respect to the gimbal can be misaligned. In addition, controlling the angle of the gimbal with respect to the back surface of the slider is difficult with current adhesive technology. In some cases, reducing the size of the droplet of adhesive would eliminate these problems. However, current equipment deposits the smallest adhesive droplet possible. Further development and modifications to the current equipment are unknown and would be costly.

Embodiments of the present invention provide solutions to these and other problems, and offer other advantages over the prior art.

SUMMARY OF THE INVENTION

The present invention is directed towards a gimbal assembly which includes a gimbal. The gimbal has a lock feature including at least one body that protrudes from a slider-engaging surface and terminates at a first end. Each body has an adhesive receiving opening extending from the first end and into the body.

In another embodiment of the present invention, the gimbal assembly includes a slider and a gimbal. The slider has at least one adhesive receiving feature which is formed on a mounting surface of the slider. The gimbal has a lock feature including at least one body that protrudes from a slider-engaging surface and terminates at a first end. Each body of the lock feature engages each adhesive receiving feature of the slider.

BRIEF DESCRIPTION OF THE DRAWINGS

FIG. 3-1 is a perspective view of a head gimbal assembly in accordance with an embodiment of the present invention.

FIG. 3-2 is a perspective view of a head gimbal assembly in accordance with an embodiment of the present invention.

FIG. 4-1 is a section view of a gimbal and a slider prior to their attachment in accordance with an embodiment of the present invention.

FIG. 4-2 is a section view of a head gimbal assembly in accordance with an embodiment of the present invention.

FIG. 5-1 is a section view of a gimbal and slider prior to their attachment in accordance with an embodiment of the present invention.

FIG. 5-2 is a section view of a head gimbal assembly in accordance with an embodiment of the present invention.

FIG. 6-1 is a section view of a gimbal and slider prior to their attachment in accordance with an embodiment of the present invention.

FIG. 6-2 is a section view of a head gimbal assembly in accordance with an embodiment of the present invention.

FIG. 7-1 is a section view of a gimbal and slider prior to their attachment in accordance with an embodiment of the present invention.

FIG. 7-2 is a section view of a head gimbal assembly in accordance with an embodiment of the present invention.

FIG. 8-1 is a section view of a gimbal and a slider prior to their attachment in accordance with an embodiment of the present invention.

FIG. 8-2 is a section view of a head gimbal assembly in accordance with an embodiment of the present invention.

FIG. 9-1 is a section view of a gimbal and slider prior to their attachment in accordance with an embodiment of the present invention.

FIG. 9-2 is a section view of a head gimbal assembly in accordance with an embodiment of the present invention.

DETAILED DESCRIPTION OF ILLUSTRATIVE EMBODIMENTS

Figure 1:
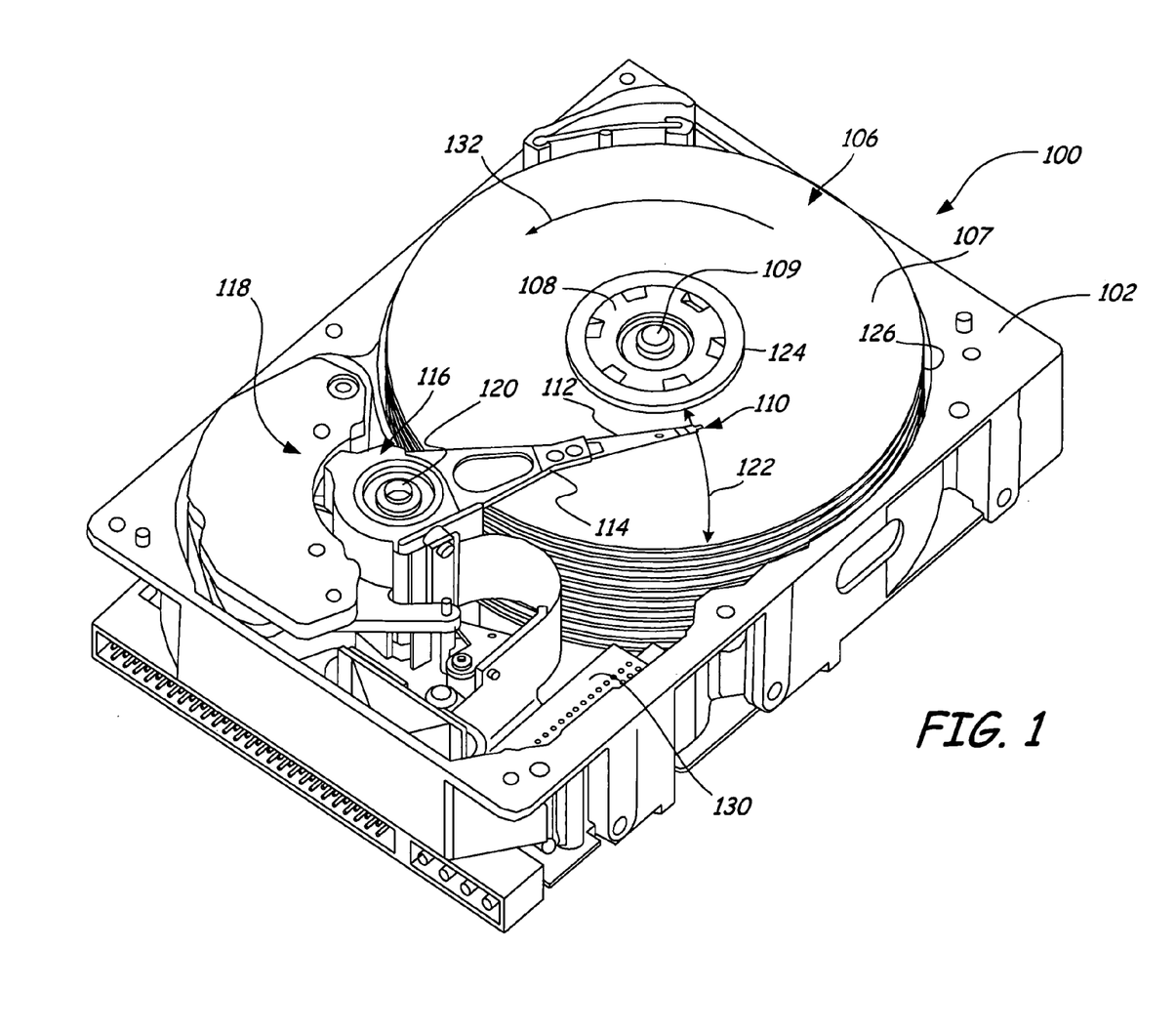
FIG. 1 is a perspective view of a disc drive.

FIG. 1 is a perspective view of a disc drive 100 in which embodiments of the present invention are useful. Disc drive 100 includes a base 102 and a top cover (not shown). Disc drive 100 further includes a disc pack 106, which is mounted on a spindle motor (not shown) by a disc clamp 108. Disc pack 106 includes a plurality of individual discs 107, which are mounted for co-rotation about central axis 109. Each disc surface has an associated head gimbal assembly (HGA) 110. HGA 110 includes a slider attached to a gimbal. The slider carries a transducer for communication with the disc surface and the gimbal allows the slider to pitch and roll while following the topography of disc 107.

Each HGA 110 is attached to a suspension 112. In turn, suspension 112 is attached to a track accessing arm 114 of an actuator mechanism 116. Actuator mechanism 116 is rotated about a shaft 120 by a voice coil motor 118, which is controlled by servo control circuitry within internal circuit 130. As voice coil motor 118 rotates actuator mechanism 116, the sliders of HGA 110 move in an arcuate path 122 between a disc inner diameter 124 and a disc outer diameter 126.

During operation, as discs 107 rotate in a rotational direction 132, the discs 107 drag air (or other fluid) under the respective sliders and along their bearing surfaces. As air passes beneath the bearing surfaces, air compression along the air flow path causes the air pressure between the disc 107 and the bearing surfaces to increase, which creates an aerodynamic lifting force that counteracts the preload force provided by suspension 112. The aerodynamic lifting force that counteracts the preload force causes the sliders to lift and fly above, but in close proximity to the disc surfaces. Alternatively, the sliders can operate in direct contact with the disc surfaces. While FIG. 1 illustrates one manner of actuating the slider proximate a data storage medium, the present invention, however, is applicable to systems that use other actuation techniques, such as a linear actuator.

Figure 2:
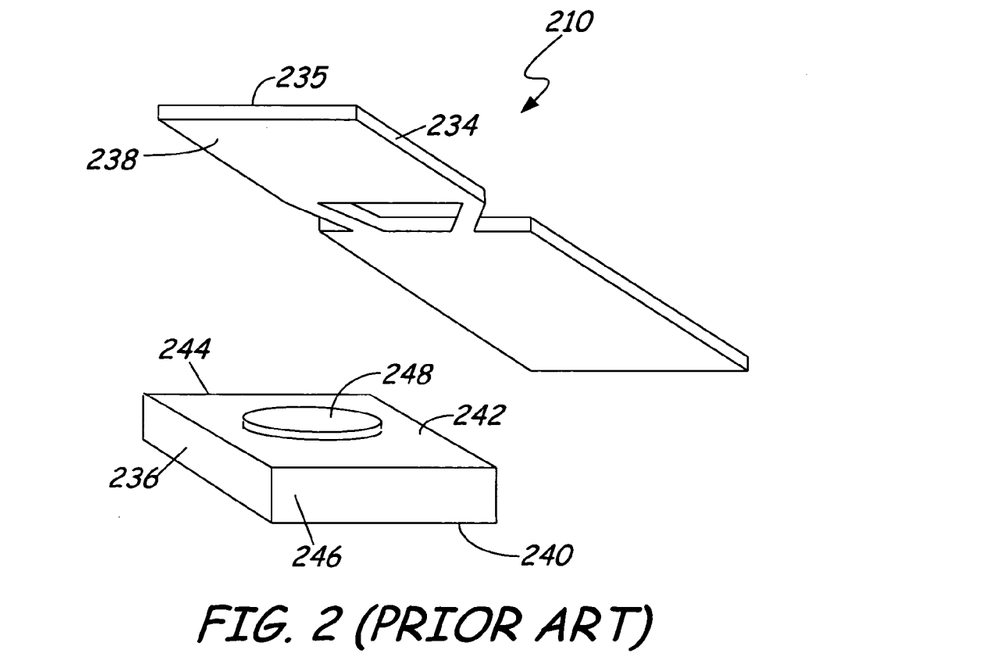
FIG. 2 is a perspective view of a head gimbal assembly in accordance with the prior art.

FIG. 2 is a perspective view of head gimbal assembly 210 in accordance with the prior art. Head gimbal assembly 210 includes gimbal 234 and slider 236 which are shown in FIG. 2 prior to their attachment by adhesive 248. Gimbal 234 has top surface 235 for coupling to a suspension and slider-engaging surface 238 for coupling to slider 236. Slider 236 has bearing surface 240, mounting surface 242, trailing edge 244 and leading edge 246. Bearing surface 240 is the disc-facing surface (or media-facing surface) and mounting surface 242 is the surface that is mounted to slider-engaging surface 238 of gimbal 234. A disc, such as disc 107 of FIG. 1, rotates relative to slider 236 at least partially in a direction from leading edge 246 to trailing edge 244. Read/write transducers are carried on trailing edge 244 for reading data from the disc and writing data to the disc. In other embodiments, the slider interacts with a surface other than a disc surface, for example, a surface of other types of storage media.

Typically, slider 236 is attached to gimbal 234 with adhesive droplet 248. Adhesive droplet 248 is deposited on mounting surface 242 of slider 236. The predetermined size of adhesive droplet 248 is an amount large enough to cause misalignment of slider 236 with respect to gimbal 234. In addition, it is important to control the angle between slider-engaging surface 238 of gimbal 234 and mounting surface 242 of slider 236. In some cases, reducing the size of adhesive droplet 248, which is deposited on mounting surface 242, would eliminate these problems. However, current equipment used for depositing adhesive droplet 248 deposits the smallest adhesive droplet possible. Thus, further development and modifications to the current equipment are unknown and would be costly.

Figure 31:
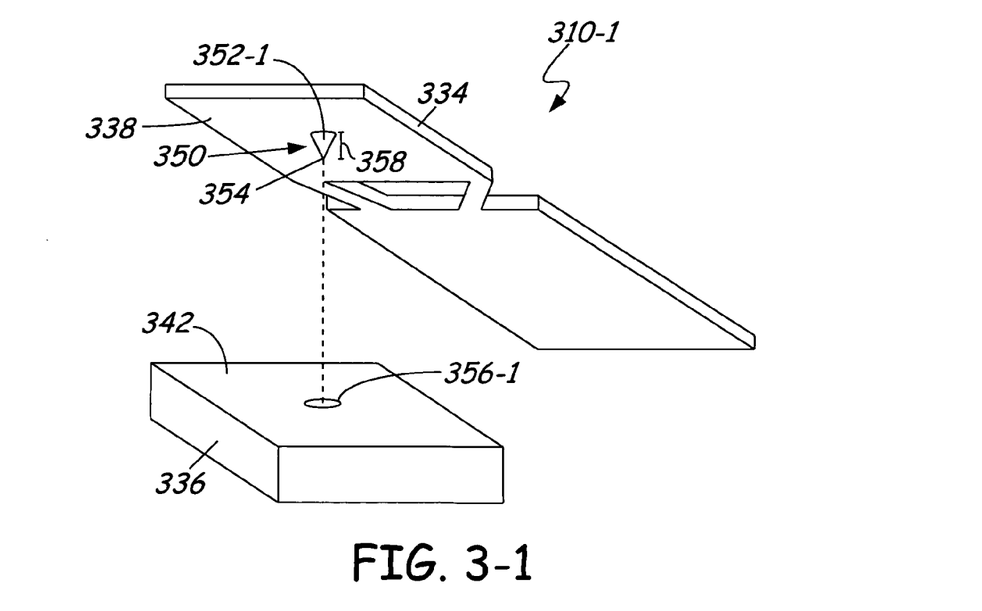
Figure 32:
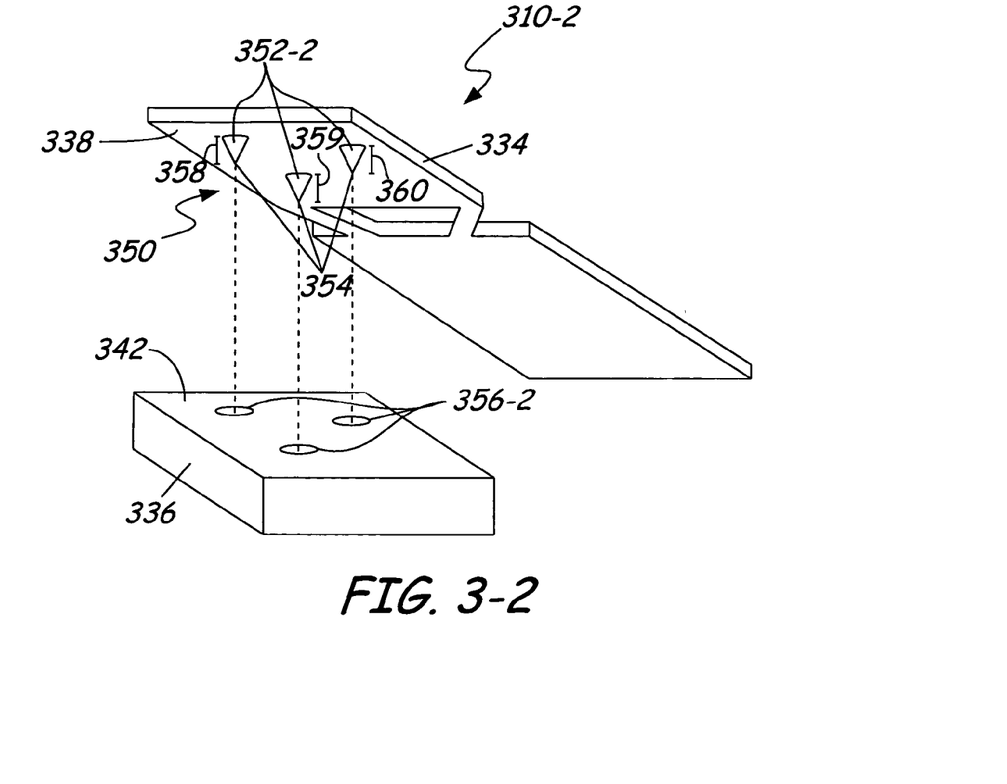

FIG. 3-1 and FIG. 3-2 are perspective views of head gimbal assemblies 310-1, 310-2 in accordance with embodiments of the present invention. Head gimbal assemblies 310-1, 310-2 include gimbal 334 and slider 336, which are shown in FIGS. 3-1 and 3-2 prior to their attachment by an adhesive. As shown in FIG. 3-1, gimbal 334 includes gimbal lock feature 350 having body 352-1 with height 358 that protrudes from slider-engaging surface 338 and terminates at first end 354. Lock feature 350 allows gimbal 334 to self-lock to slider 336 for precise position control of both gimbal 334 and slider 336. Slider 336 includes adhesive receiving feature 356-1 formed on mounting surface 342 and having a depth (not shown in FIG. 3-1). The interior surfaces of adhesive receiving feature 356-1 effectively increase the surface area of mounting surface 342 since a portion of the adhesive is received into feature 356-1. Body 352-1 is configured to engage adhesive receiving feature 356-1 such that height 358 of body 352-1 is inserted into the depth of adhesive receiving feature 356-1. As shown in FIG. 3-1, providing a single lock feature as well as a single adhesive receiving feature allows slider 336 to be positioned in more degrees of freedom.

In FIG. 3-2, gimbal 334 includes lock feature 350 having a plurality of bodies 352-2 that protrude from slider-engaging surface 338 and terminate at first ends 354. Each body 352-2 has a height 358, 359 and 360. Slider 336 includes a plurality of adhesive receiving features 356-2 formed on mounting surface 342. Each adhesive receiving feature 356-2 has a depth (not shown in FIG. 3-2). To vary the angle between slider-engaging surface 338 and mounting surface 342, each body 352-2 can be provided with a different height 358, 359 and 360 that corresponds with each adhesive receiving feature 356-2 that all have a single depth. The angle can also be varied by providing each adhesive receiving feature 356-2 with a different depth that corresponds with each body 352-2 having a single height.

Figure 41:
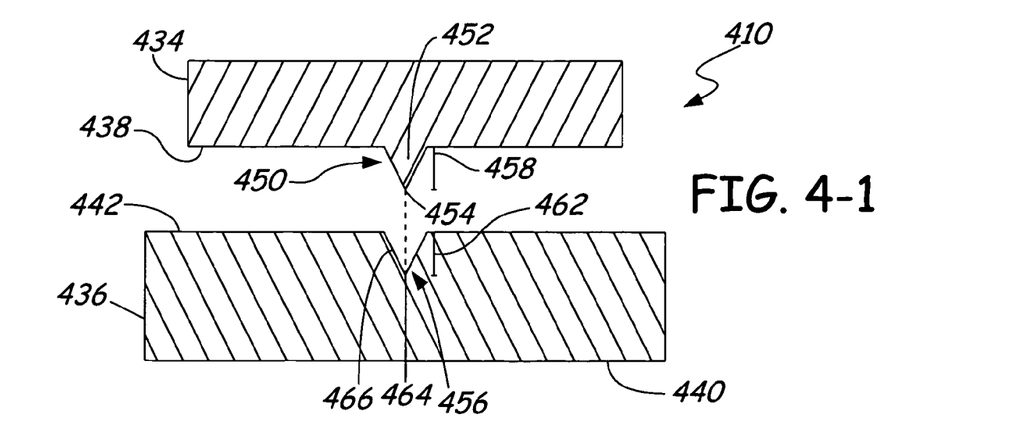
Figure 42:
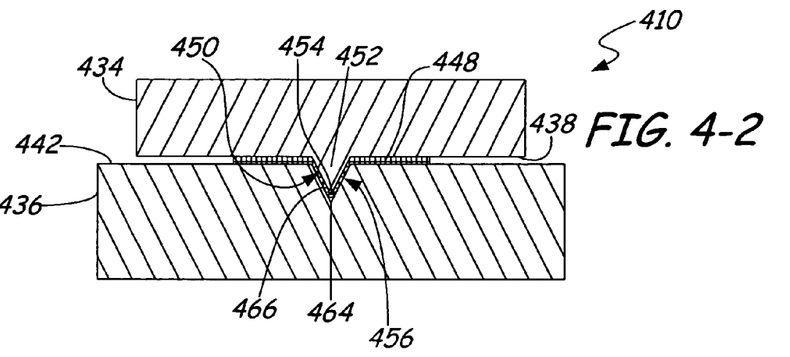

FIGS. 4-1 and 4-2 are section views of head gimbal assembly 410 in accordance with an embodiment of the present invention. FIG. 4-1 illustrates gimbal 434 and slider 436 before they are adhered together by an adhesive. Body 452 of gimbal lock feature 450 includes a conical geometry. Body 452 has height 458 that protrudes from slider-engaging surface 438 and terminates at first end 454. Adhesive receiving feature 456 also includes a conical geometry having depth 462 that extends from mounting surface 442 into slider 436 in a direction towards bearing surface 440. Adhesive receiving feature includes bottom end 464 and side surface 466.

FIG. 4-2 illustrates gimbal 434 attached to slider 436 with adhesive droplet 448. Adhesive droplet 448 is deposited into adhesive receiving feature 456 and on a portion of mounting surface 442. Gimbal 434 is then attached to slider 436 by engaging first end 454 of body 452 with bottom end 464 of adhesive receiving feature 456 such that they are adjacent to each other. By attaching gimbal 434 to slider 436, adhesive droplet 448 spreads along mounting surface 442 and along slider-engaging surface 438 in a direction towards their outer edges.

As shown in FIGS. 4-1 and 4-2, adhesive receiving feature 456 effectively reduces the size of adhesive droplet 448 by increasing the surface area of mounting surface 442. Lock feature 450, in turn, controls the position of slider 436 relative to gimbal 434.

FIGS. 5-1 and 5-2 are section views of head gimbal assembly 510 in accordance with an embodiment of the present invention. FIG. 5-1 illustrates gimbal 534 and slider 536 before they are adhered together by an adhesive. Body 552 of gimbal lock feature 550 includes a cylindrical geometry. Body 552 has height 558 that protrudes from slider-engaging surface 538 and terminates at first end 554. Body 552 also includes adhesive receiving opening 568 which extends from first end 554 and into body 552 in a direction towards top surface 535 of gimbal 534. Adhesive receiving opening 568 includes end surface 570 and side surface 572. Adhesive receiving feature 556 also includes a cylindrical geometry having depth 562 that extends from mounting surface 542 into slider 536 in a direction towards bearing surface 540. Adhesive receiving feature 556 includes a cylindrical geometry having bottom surface 564 and side surface 566. The conical geometry illustrated in FIGS. 4-1 and 4-2 and the cylindrical geometry illustrated in FIGS. 5-1 and 5-2 are merely examples. Those skilled in the art will recognize that the gimbal lock feature and the adhesive receiving feature of the present invention can include any type of geometry as long as the body of the gimbal lock feature can engage with the adhesive receiving feature of the slider.

Figure 52:
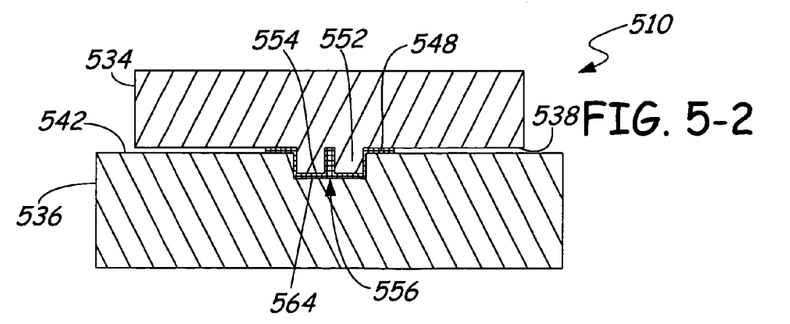

FIG. 5-2 illustrates gimbal 534 attached to slider 536 with adhesive droplet 548. Adhesive droplet 548 is deposited into adhesive receiving feature 556 and on a portion of mounting surface 542. Gimbal 534 is then attached to slider 536 by engaging first end 554 of body 552 with bottom surface 564 of adhesive receiving feature 556 such that they are adjacent to each other. By attaching gimbal 534 to slider 536, adhesive droplet 548 spreads along mounting surface 542 and slider-engaging surface 538 in a direction towards their outer edges and into adhesive receiving opening 568.

Figure 51:
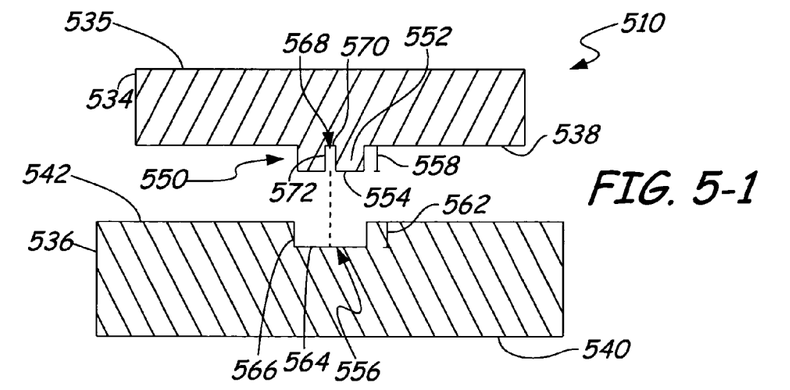

As shown in FIGS. 5-1 and 5-2, adhesive receiving feature 556 as well as adhesive receiving opening 568 of lock feature 550 effectively reduce the size of adhesive droplet 548 by respectively increasing the surface area of mounting surface 542 and increasing the surface area of slider-engaging surface 538. In addition, lock feature 550 controls the position of slider 536 relative to gimbal 534.

Figure 61:
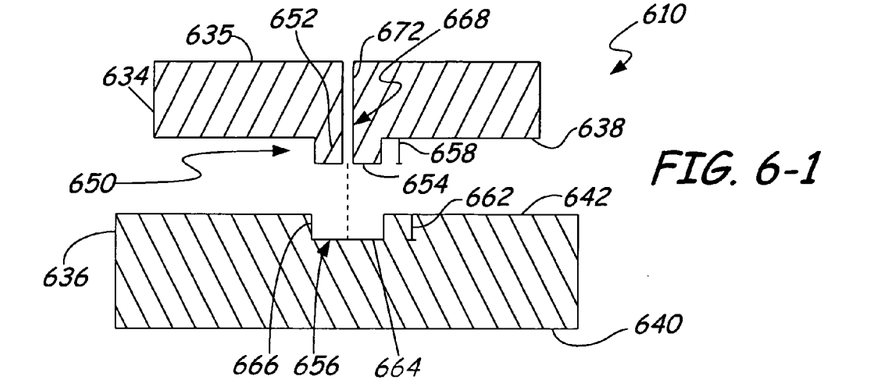
Figure 62:
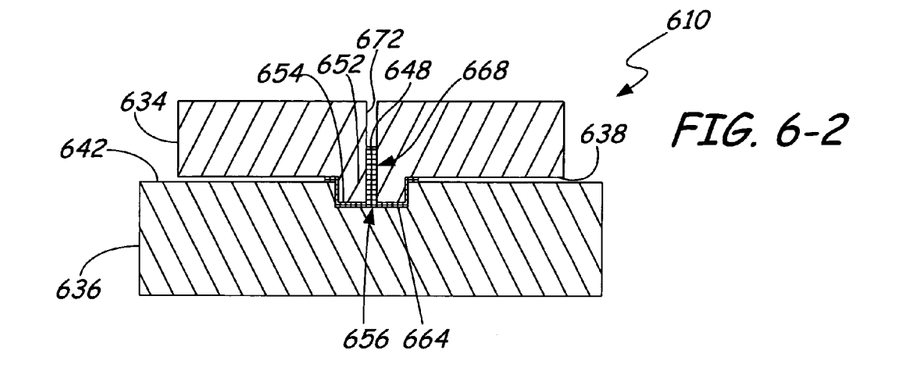

FIGS. 6-1 and 6-2 are section views of head gimbal assembly 610 in accordance with an embodiment of the present invention. FIG. 6-1 illustrates gimbal 634 and slider 636 before they are adhered together by an adhesive. Body 652 of gimbal lock feature 650 includes height 658 that protrudes from slider-engaging surface 638 and terminates at first end 654. Body 652 also includes adhesive receiving opening 668 which extends from first end 654 through body 652 to top surface 635 of gimbal 634. Adhesive receiving opening 668 includes side surface 672. Adhesive receiving feature 656 includes depth 662 that extends from mounting surface 642 into slider 636 in a direction towards bearing surface 640. Adhesive receiving feature 656 also includes bottom surface 664 and side surface 666.

FIG. 6-2 illustrates gimbal 634 attached to slider 636 with adhesive droplet 648. Adhesive droplet 648 is deposited into adhesive receiving feature 656 and on a portion of mounting surface 642. Gimbal 634 is then attached to slider 636 by engaging first end 654 of body 652 with bottom surface 664 of adhesive receiving feature 656 such that they are adjacent each other. By attaching gimbal 634 to slider 636, adhesive droplet 648 spreads along mounting surface 642 and spreads along slider-engaging surface 638 in a direction towards their outer edges and spreads up side surface 672 of adhesive receiving opening 668.

As shown in FIGS. 6-1 and 6-2, adhesive receiving feature 656 as well as adhesive receiving opening 668 of lock feature 650 effectively reduce the size of adhesive droplet 648 by respectively increasing the surface area of mounting surface 642 and increasing the surface area of slider-engaging surface 638. In addition, lock feature 650 controls the position of slider 636 relative to gimbal 634.

Figure 71:
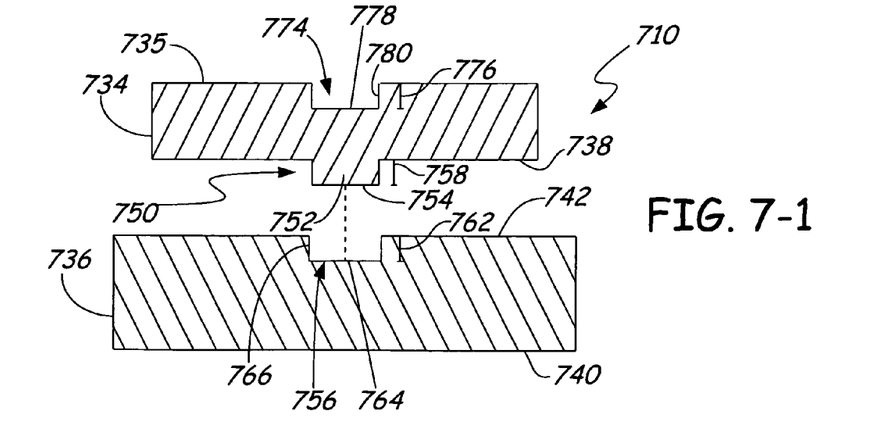
Figure 72:
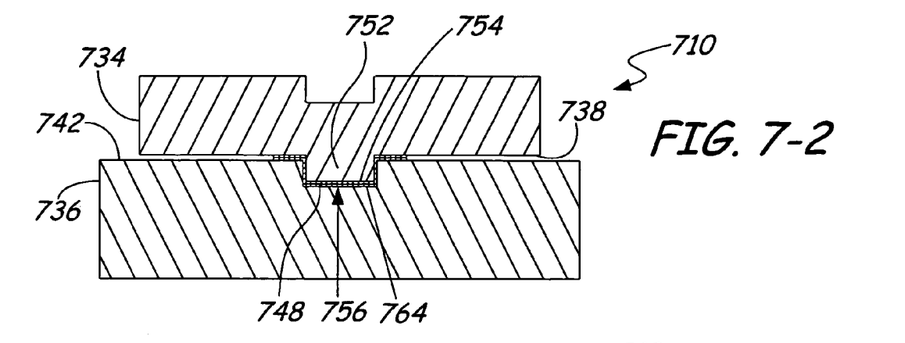

FIGS. 7-1 and 7-2 are section views of head gimbal assembly 710 in accordance with an embodiment of the present invention. FIG. 7-1 illustrates gimbal 734 and slider 736 before they are adhered together by an adhesive. For example, in FIGS. 7-1 and 7-2, gimbal lock feature 750 is formed through a cost-effective manufacturing process called stamping. The gimbal material is pressed from top surface 735 towards slider-engaging surface 738 to form body 752 and reservoir 774. Those skilled in the art will recognize that other types of manufacturing processes can be used to achieve the same configuration. Body 752 includes height 758 that protrudes from slider-engaging surface 738 and terminates at first end 754. Reservoir 774 includes depth 776 that extends into gimbal 734 from top surface 735 in a direction towards slider-engaging surface 738. Reservoir 774 also includes bottom surface 778 and side surface 780. Depth 776 of reservoir 774 is equivalent to height 758 of body 752. Adhesive receiving feature 756 includes depth 762 that extends from mounting surface 742 into slider 736 in a direction towards bearing surface 740. Adhesive receiving feature 756 also includes bottom surface 764 and side surface 766.

FIG. 7-2 illustrates gimbal 734 attached to slider 736 with adhesive droplet 748. Adhesive droplet 748 is deposited into adhesive receiving feature 756 and on a portion of mounting surface 742. Gimbal 734 is then attached to slider 736 by engaging first end 754 of body 752 with bottom surface 764 of adhesive receiving feature 756 such that they are adjacent each other. By attaching gimbal 734 to slider 736, adhesive droplet 748 spreads along mounting surface 742 and along slider-engaging surface 738 to their outer edges.

As shown in FIGS. 7-1 and 7-2, adhesive receiving feature 756 effectively reduces the size of adhesive droplet 748 by increasing the surface area of mounting surface 742. In addition, lock feature 750 controls the position of slider 736 relative to gimbal 734.

Figure 81:
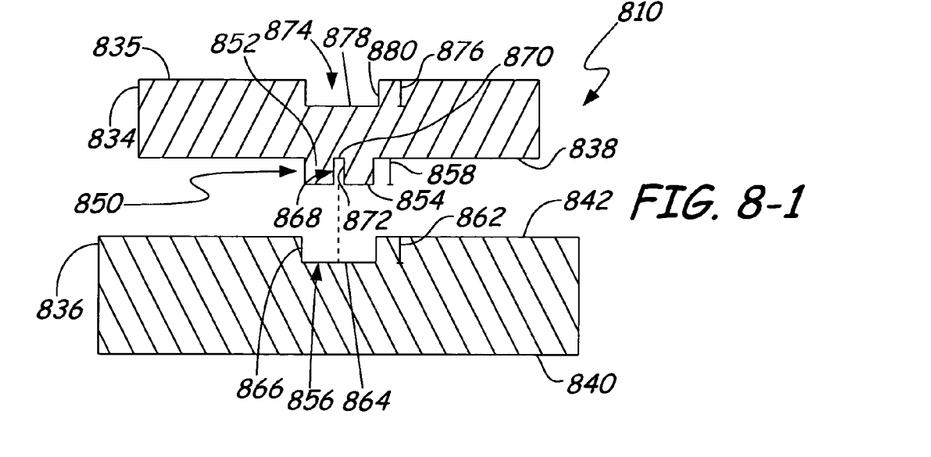
Figure 82:
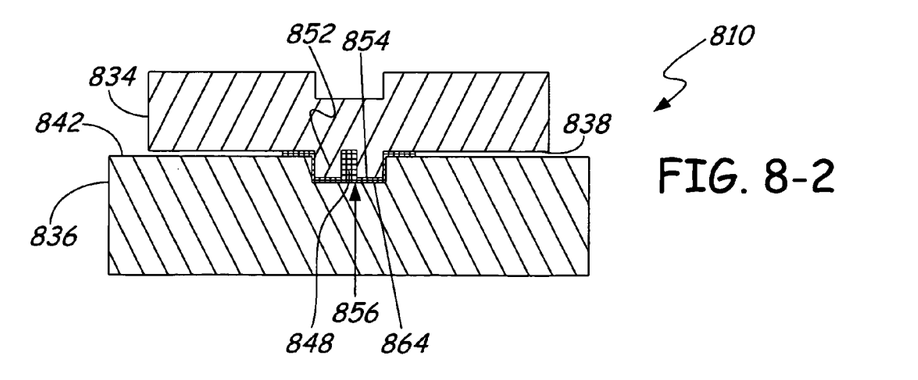

FIGS. 8-1 and 8-2 are section views of head gimbal assembly 810 in accordance with an embodiment of the present invention. FIG. 8-1 illustrates gimbal 834 and slider 836 before they are adhered together by an adhesive. For example, in FIGS. 8-1 and 8-2, gimbal lock feature 850 is formed through a stamping manufacturing process. The gimbal material is pressed from top surface 835 towards slider-engaging surface 838 to form body 852 and reservoir 874. Those skilled in the art will recognize that other types of manufacturing processes can be used to achieve the same configuration. Body 852 includes height 858 that protrudes from slider-engaging surface 838 and terminates at first end 854. Body 852 also includes adhesive receiving opening 868 which extends from first end 854 and into body 852 of gimbal 834. Adhesive receiving opening 868 includes end surface 870 and side surface 872. Reservoir 874 includes depth 876 that extends into gimbal 834 from top surface 835 in a direction towards slider-engaging surface 838. Reservoir 874 also includes bottom surface 878 and side surface 880. Depth 876 of reservoir 874 is equivalent to height 858 of body 852. Adhesive receiving feature 856 includes depth 862 that extends from mounting surface 842 into slider 836 in a direction towards bearing surface 840. Adhesive receiving feature 856 also includes bottom surface 864 and side surface 866.

FIG. 8-2 illustrates gimbal 834 attached to slider 836 with adhesive droplet 848. Adhesive droplet 848 is deposited into adhesive receiving feature 856 and on a portion of mounting surface 842. Gimbal 834 is then attached to slider 836 by engaging first end 854 of body 852 with bottom surface 864 of adhesive receiving feature 856 such that they are adjacent each other. By attaching gimbal 834 to slider 836, adhesive droplet 848 spreads along mounting surface 842 and slider-engaging surface 838 in a direction towards their outer edges and into adhesive receiving opening 868.

As shown in FIGS. 8-1 and 8-2, adhesive receiving feature 856 as well as adhesive receiving opening 868 of lock feature 850 effectively reduce the size of adhesive droplet 848 by respectively increasing the surface area of mounting surface 842 and increasing the surface area of slider-engaging surface 838. In addition, lock feature 850 controls the position of slider 836 relative to gimbal 834.

Figure 91:
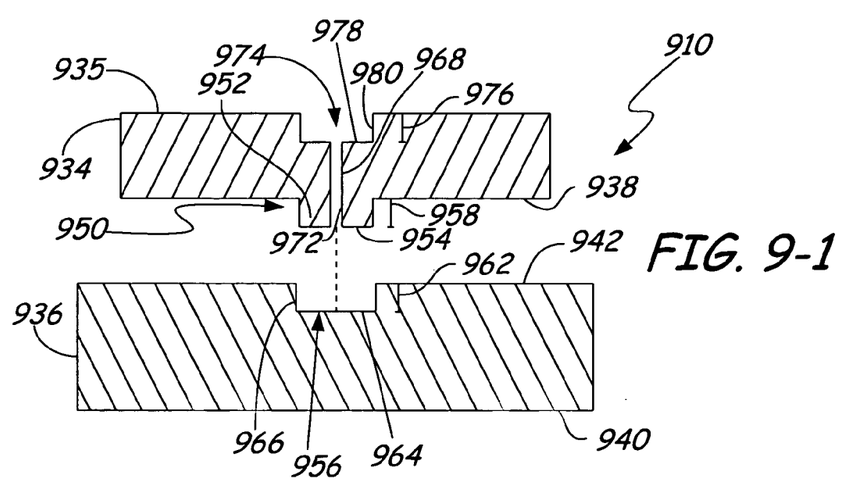
Figure 92:
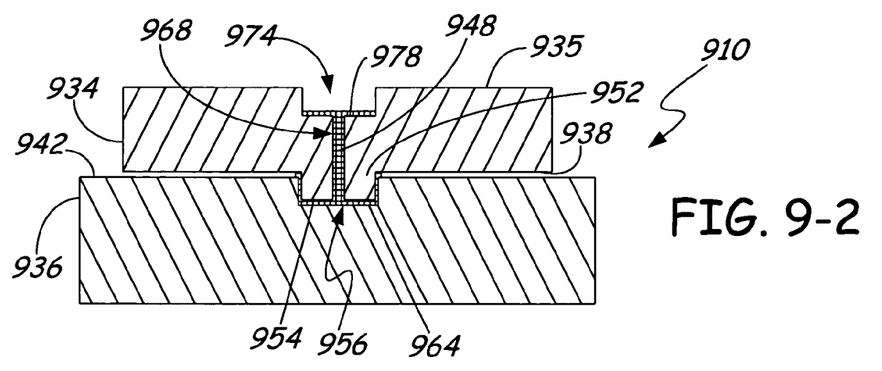

FIGS. 9-1 and 9-2 are section views of head gimbal assembly 910 in accordance with an embodiment of the present invention. FIG. 9-1 illustrates gimbal 934 and slider 936 before they are adhered together by an adhesive. For example, in FIGS. 9-1 and 9-2, gimbal lock feature 950 is formed through a stamping manufacturing process. The gimbal material is pressed from top surface 935 towards slider-engaging surface 938 to form body 952 and reservoir 974. Those skilled in the art will recognize that other types of manufacturing processes can be used to achieve the same configuration. Body 952 includes height 958 that protrudes from slider-engaging surface 938 and terminates at first end 954. Body 952 also includes adhesive receiving opening 968 which extends from first end 954 through body 952 to top surface 935 of gimbal 934. Adhesive receiving opening 968 includes side surface 972. Reservoir 974 includes depth 976 that extends into gimbal 934 from top surface 935 in a direction towards slider-engaging surface 938. Reservoir 974 also includes bottom surface 978 and side surface 980. Depth 976 of reservoir 974 is equivalent to height 958 of body 952. Adhesive receiving feature 956 includes depth 962 that extends from mounting surface 942 into slider 936 in a direction towards bearing surface 940. Adhesive receiving feature 956 also includes bottom surface 964 and side surface 966.

FIG. 9-2 illustrates gimbal 934 attached to slider 936 with adhesive droplet 948. Adhesive droplet 948 is deposited on bottom surface 978 of reservoir 974. Adhesive droplet 948 travels through adhesive receiving opening 968 into adhesive receiving feature 956 thereby attaching gimbal 934 to slider 936 by engaging first end 954 of body 952 with bottom surface 964 of adhesive receiving feature 956.

As shown in FIGS. 9-1 and 9-2, adhesive receiving feature 956 and lock feature 950 effectively reduce the size of adhesive droplet 948 by increasing the surface area of mounting surface 942 and increasing the surface area of slider-engaging surface 938. In addition, by depositing adhesive droplet 948 into reservoir 974 and allowing adhesive droplet 948 to spread to adhesive receiving feature 956, gimbal 934 is adhered to slider 936 with a more resilient connection. In addition, lock feature 950 controls the position of slider 936 relative to gimbal 934.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the assembly while maintaining substantially the same functionality without departing from the scope and spirit of the present invention. In addition, although the preferred embodiment described herein is directed to a head gimbal assembly for a data storage system, it will be appreciated by those skilled in the art that the teachings of the present invention can be applied to other types of gimbal assemblies, without departing from the scope and spirit of the present invention.

What is claimed is:

1. A gimbal assembly comprising a gimbal having a lock feature including at least one body that protrudes from a slider-engaging surface and terminates at a first end, each body having an adhesive receiving opening extending from the first end and into the body.

2. The gimbal assembly of claim 1 and further comprising a slider having at least one adhesive receiving feature formed on a mounting surface of the slider, each adhesive receiving feature extending into the slider towards a bearing surface.

3. The gimbal assembly of claim 2, wherein each body of the lock feature is configured to engage with a corresponding adhesive receiving feature.

4. The gimbal assembly of claim 2 and further comprising an adhesive droplet deposited on a portion of the mounting surface and into each of the adhesive receiving features, wherein the adhesive droplet adheres the slider to the gimbal.

5. The gimbal assembly of claim 1, wherein the adhesive receiving opening of each body further extends from the first end and through the body to a top surface of the gimbal opposite the slider-engaging surface.

6. The gimbal assembly of claim 1, wherein the lock feature further comprises at least one reservoir having a bottom surface and side surface and formed on a top surface of the gimbal opposite the slider-engaging surface, wherein each reservoir extends into the gimbal in a direction towards the slider-engaging surface and corresponds with a corresponding body.

7. The gimbal assembly of claim 6, wherein the adhesive receiving opening of each body further extends from the first end and through the body to the bottom surface of a corresponding reservoir.

8. The gimbal assembly of claim 7 and further comprising an adhesive droplet deposited into each reservoir, wherein the adhesive droplet spreads though the adhesive receiving opening of each body to a corresponding adhesive receiving feature such that the slider is adhered to the gimbal.

9. A gimbal assembly comprising:
a slider having at least one adhesive receiving feature formed on a mounting surface of the slider that is enclosed by a bottom end and surrounding side surfaces and has an open top end adjacent the mounting surface, each adhesive receiving feature extending into the slider in a direction towards a bearing surface; and
a gimbal having a lock feature including at least one body that protrudes from a slider-engaging surface and terminates at a first end, wherein each body of the lock feature is configured to engage a corresponding adhesive receiving feature of the slider.

10. The gimbal assembly of claim 9, wherein each body of the lock feature comprises a geometry that corresponds with a geometry of the corresponding adhesive receiving feature.

11. The gimbal assembly of claim 10, wherein the geometry of each body and the geometry of each corresponding adhesive receiving feature comprises a cylinder.

12. The gimbal assembly of claim 9 and further comprising an adhesive droplet deposited on a portion of the mounting surface and into each of the adhesive receiving features, wherein the adhesive droplet adheres the slider to the gimbal.

13. The gimbal assembly of claim 9, wherein each body comprises an adhesive receiving opening extending from the first end and into the body.

14. The gimbal assembly of claim 9, wherein each body comprises an adhesive receiving opening extending from the first end and though the body to a top surface of the gimbal opposite the slider-engaging surface.

15. The gimbal assembly of claim 9, wherein the lock feature further comprises at least one reservoir having a bottom surface and side surface and formed on a top surface of the gimbal opposite the slider-engaging surface, wherein each reservoir extends into the gimbal in a direction towards the slider-engaging surface and corresponds with a corresponding body.

16. The gimbal assembly of claim 15, wherein each body comprises an adhesive receiving opening extending from the first end and into the body.

17. The gimbal assembly of claim 15, wherein each body comprises an adhesive receiving opening extending from the first end and though the body to the bottom surface of a corresponding reservoir.

18. The gimbal assembly of claim 17 and further comprising an adhesive droplet deposited on the top surface of the gimbal and into each reservoir, the adhesive droplet spreading though the adhesive receiving opening of each body to the corresponding adhesive receiving feature of the slider such that the slider is adhered to the gimbal.

19. A gimbal assembly comprising a gimbal having a lock feature including at least one body that protrudes from a slider-engaging surface and terminates at a first end and including at least one reservoir having a bottom surface and side surface and formed on a top surface of the gimbal opposite the slider-engaging surface, wherein each reservoir extends into the gimbal in a direction towards the slider-engaging surface and corresponds with body.

20. The gimbal assembly of claim 19, wherein each body includes an adhesive receiving opening extending from the first end of each body and into each body towards the top surface of the gimbal.

* * * * *

UNITED STATES PATENT AND TRADEMARK OFFICE
CERTIFICATE OF CORRECTION

PATENT NO. : 7,199,979 B2  
APPLICATION NO. : 10/761079  
DATED : April 3, 2007  
INVENTOR(S) : Lee Walter et al.

Page 1 of 1

It is certified that error appears in the above-identified patent and that said Letters Patent is hereby corrected as shown below:

Column 9, line 11 change "though" to --through--.

Column 20, line 10 after "corresponds with" insert --each--.

Signed and Sealed this

Fifteenth Day of May, 2007

JON W. DUDAS  
*Director of the United States Patent and Trademark Office*